US010355629B2

(12) United States Patent
Hardwicke, Jr. et al.

(10) Patent No.: US 10,355,629 B2
(45) Date of Patent: Jul. 16, 2019

(54) CONTROL METHOD FOR PROTECTING GENERATORS

(71) Applicant: General Electric Company, Schenectady, NY (US)

(72) Inventors: Edward Wayne Hardwicke, Jr., Greenville, SC (US); Daniel Jordy, Glenville, NY (US); Timothy Jayko, Saratoga Springs, NY (US); Talha Haque, Roanoke, VA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/608,073

(22) Filed: May 30, 2017

(65) Prior Publication Data

US 2018/0351492 A1    Dec. 6, 2018

(51) Int. Cl.
| | | |
|---|---|---|
| *F03D 7/02* | (2006.01) | |
| *F03D 9/25* | (2016.01) | |
| *G05F 1/66* | (2006.01) | |
| *G05F 1/70* | (2006.01) | |
| *H02J 3/38* | (2006.01) | |
| *H02P 9/00* | (2006.01) | |
| *H02P 9/30* | (2006.01) | |

(Continued)

(52) U.S. Cl.
CPC .............. *H02P 9/305* (2013.01); *F03D 9/257* (2017.02); *G05F 1/66* (2013.01); *G05F 1/70* (2013.01); *H02J 3/386* (2013.01); *H02P 9/006* (2013.01); *H02P 9/48* (2013.01); *F03D 7/0272* (2013.01); *H02P 9/007* (2013.01); *H02P 29/60* (2016.02); *H02P 2101/15* (2015.01)

(58) Field of Classification Search
CPC .. H02P 9/305; H02P 9/006; H02P 9/48; H02P 9/007; F03D 9/257
USPC ....................................................... 290/44, 55
See application file for complete search history.

(56) References Cited

U.S. PATENT DOCUMENTS 5,610,485 A * 3/1997 Depenbrock ........... H02P 21/06
318/432
6,316,819 B1 11/2001 Zivic
(Continued)

OTHER PUBLICATIONS

Garcia, J.M., "Voltage Control in Wind Power Plants with Doubly Fed Generators," Department of Energy Technology, Aalborg University, pp. 1-230 (2010) (Abstract).
(Continued)

*Primary Examiner* — Charles Reid, Jr.
(74) *Attorney, Agent, or Firm* — Dority & Manning, P.A.

(57) ABSTRACT

Systems and methods for protecting a generator are provided. An example method can include receiving a signal indicative of a voltage associated with a stator. The method can include receiving a signal indicative of a nominal voltage associated with the stator. The method can include receiving a signal indicative of a monitoring state associated with the generator. The method can include receiving a signal indicative of a deadband range. The method can include determining a voltage ratio based at least in part on the voltage associated with the stator and the nominal voltage. The method can include determining an adjusted operating limit using a multiplier determined based at least in part on the voltage ratio. The method can include generating a power command to control operation of the generator based at least in part on the adjusted operating limit.

20 Claims, 9 Drawing Sheets

(51) Int. Cl.
*H02P 9/48* (2006.01)
*H02P 29/60* (2016.01)
*H02P 101/15* (2016.01)

(56) References Cited

U.S. PATENT DOCUMENTS

| | | | |
|---|---|---|---|
| 6,696,676 B1 * | 2/2004 | Graves | F24C 7/087 |
| | | | 219/492 |
| 7,834,472 B2 | 11/2010 | Rebsdorf et al. | |
| 2010/0133831 A1 | 6/2010 | Scholte-Wassink et al. | |
| 2015/0159625 A1 | 6/2015 | Hardwicke, Jr. et al. | |
| 2016/0065105 A1 | 3/2016 | Hardwicke, Jr. et al. | |
| 2016/0341179 A1 | 11/2016 | Klodowski et al. | |
| 2016/0348646 A1 | 12/2016 | Barker et al. | |

OTHER PUBLICATIONS

Extended European Search Report and Opinion issued in connection with corresponding EP Application No. 18173442.7 dated Oct. 17, 2018.

* cited by examiner

CONTROL METHOD FOR PROTECTING GENERATORS

FIELD

The present disclosure relates generally to renewable energy power systems, and more particular to an energy storage system for use in a renewable energy power system.

BACKGROUND

Wind turbines have received increased attention as a renewable energy source for generating electricity. Wind turbine power systems can include one or more generators. The one or more generators can make adjustments based on conditions. For example, the one or more generators can make adjustments to a current in response to a measured voltage. The one or more generators can be controlled to operate within certain operating limits, such as current limits and/or temperature limits. However, the operating limits can sometimes prevent the one or more generators from making appropriate adjustments in response to varying conditions.

BRIEF DESCRIPTION

Aspects and advantages of embodiments of the present disclosure will be set forth in part in the following description, or may be learned from the description, or may be learned through practice of the embodiments.

Systems and methods for protecting a generator are provided by the present disclosure. An example method can include receiving a signal indicative of a voltage associated with a stator. The method can include receiving a signal indicative of a nominal voltage associated with the stator. The method can include receiving a signal indicative of a monitoring state associated with the generator. The method can include receiving a signal indicative of a deadband range. The method can include determining a voltage ratio based at least in part on the voltage associated with the stator and the nominal voltage. The method can include determining an adjusted operating limit using a multiplier determined based at least in part on the voltage ratio. The method can include generating a power command to control operation of the generator based at least in part on the adjusted operating limit.

An example system can include one or more control devices. The one or more control devices can be configured to receive a signal indicative of a voltage associated with a stator. The one or more control devices can be configured to receive a signal indicative of a nominal voltage associated with the stator. The one or more control devices can be configured to receive a signal indicative of a monitoring state associated with the generator. The one or more control devices can be configured to receive a signal indicative of a deadband range. The one or more control devices can be configured to determine a voltage ratio based at least in part on the voltage associated with the stator and the nominal voltage. The one or more control devices can be configured to determine an adjusted operating limit using a multiplier based at least in part on the voltage ratio. The one or more control devices can be configured to generate a power command to control operation of the generator based at least in part on the adjusted operating limit.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
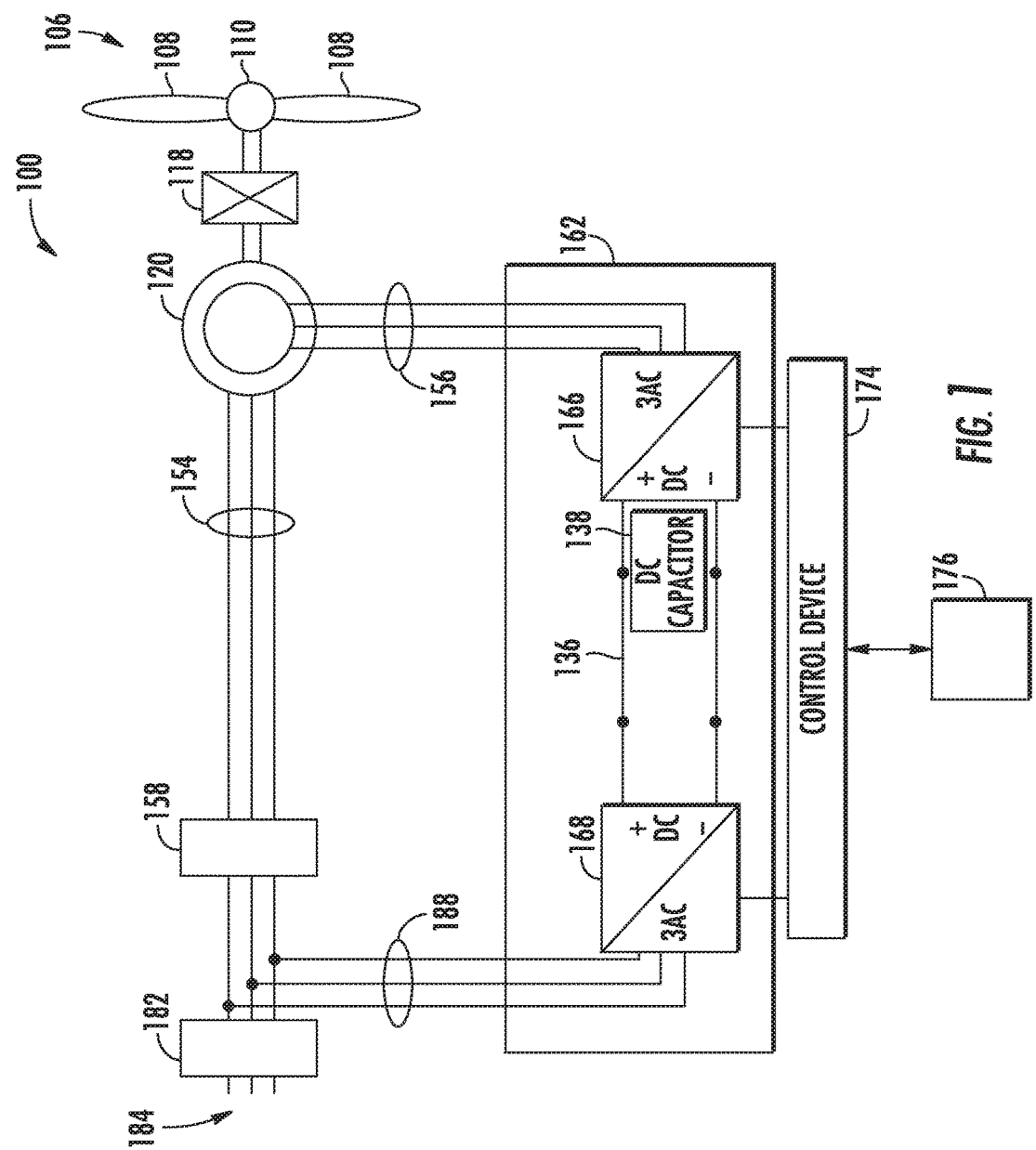
FIG. 1 depicts an example DFIG power system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third," etc. may be used interchangeably to distinguish one component from another and are not intended to signify location or importance of the individual components or limit the number of individual components in an apparatus. As used herein, the term "approximately" when used in reference to a voltage means within 25 volts of the stated value. As used in the specification and the appended claims, the singular forms "a," "an," and "the" include plural referents unless the context clearly dictates otherwise.

Example aspects of the present disclosure are directed to systems and methods for controlling one or more generators of a power system. In example embodiments, the one or more generators can be controlled to make power output (e.g., real and/or reactive power output) adjustments based on varying conditions. As one example, the one or more generators can make adjustments to a output current in response to a measured output voltage associated with the generator. More specifically, as a measured voltage decreases, a current level can be increased to maintain the same power output. Additionally, as a measured voltage increases, a current level can be decreased to maintain the same power output.

The one or more generators can be controlled to operate within operating limits, such as current limits and/or temperature limits. However, the operating limits can sometimes prevent the one or more generators from making appropriate adjustments in response to varying conditions. According to aspects of the present disclosure, a multiplier can be determined based on parameters such as a measured voltage associated with the generator. The multiplier can be used to modify one or more operating limits for the generator. For example, the modified current limit can be the original current limit multiplied by the multiplier. As another example, the modified temperature limit can be the original temperature limit multiplied by the multiplier. Based on the comparison of the modified operating limit to the operating condition of the generator, a control system can control a converter connected to rotor of the generator to reduce the current through the stator and/or rotor, in order to protect the generator to an increased capability of the generator.

In some embodiments, a control system associated with a generator can determine a voltage ratio of a voltage measured on a stator of the generator relative to a nominal voltage. If the voltage ratio falls below a certain deadband range, then a "monitored" state can be entered. Further, a multiplier can be determined. If the voltage ratio is below a voltage lower limit, then the multiplier can be determined based on the voltage lower limit. If the voltage ratio is not below the voltage lower limit, then the multiplier can be determined based on the voltage ratio.

If the voltage ratio is above the deadband range, then a check can be made to determine whether the voltage ratio is equal to or above a threshold (e.g., 1). If the voltage ratio is equal to or above the threshold, then a "not monitored" state can be entered. If the voltage ratio is not equal to or above the threshold and the current state is "monitored", then a multiplier can be determined. As above, if the voltage ratio is below a voltage lower limit, then the multiplier can be determined based on the voltage lower limit. As above, if the voltage ratio is not below the voltage lower limit, then the multiplier can be determined based on the voltage ratio.

In this way, the systems and methods according to example aspects of the present disclosure can have a number of technical effects and benefits. For instance, example aspects of the present disclosure have a technical effect of increasing operating ranges of generators under varying conditions. This can lead to increased energy capture and energy production due to reduced derating of the generator.

With reference now to the figures, example aspects of the present disclosure will be discussed in greater detail. FIG. 1 depicts a DFIG system 100 according to example aspects of the present disclosure, which includes a DFIG 120. The present disclosure will be discussed with reference to the example DFIG system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example DFIG system 100, a rotational component 106 includes a plurality of rotor blades 108 coupled to a rotating hub 110. The rotational component 106 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. The DFIG 120 is typically coupled to a stator bus 154 and a power converter 162 via a rotor bus 156. The stator bus provides an output multiphase power (e.g. three-phase power) from a stator of DFIG 120 and the rotor bus 156 provides a multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188. In various embodiments, a transformer (not shown) can be coupled to line side bus 188 to convert the AC power from the line side bus to a voltage suitable for application to a cluster network or an electrical grid 184.

In example configurations, the rotor side converter 166 and the line side converter 168 are configured for operating using pulse width modulation (PWM) arrangement of IGBT switching devices or other switching devices. The rotor side converter 166 and the line side converter 168 can be coupled via a DC bus 136 across which is the DC link capacitor 138.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In some configurations, various line contactors and circuit breakers including, for example, cluster breaker or grid breaker 182, rotor bus breaker 158, a line bus contactor, and a line bus breaker can be included for isolating various components as necessary for normal operation of DFIG 120 during connection to and disconnection from the cluster network or the electrical grid 184. A line bus breaker 186 can couple a system bus to a transformer, which is coupled to the cluster network or the electrical grid 184 via the cluster breaker or grid breaker 182.

In operation, power generated at DFIG 120 by rotating the rotational component 106 is provided via a dual path to the cluster network or the electrical grid 184. The dual paths are defined by the stator bus 154 and the rotor bus 156. On the rotor bus side 156, sinusoidal multi-phase (e.g. three-phase) AC power is provided to the power converter 162. The rotor side power converter 166 converts the AC power provided from the rotor bus 156 into direct current ("DC") power and provides the DC power to the DC bus 136. Switching devices (e.g. IGBTs) used in parallel bridge circuits of the rotor side power converter 166 can be modulated to convert the AC power provided from the rotor bus 156 into DC power suitable for the DC bus 136.

The line side converter 168 converts the DC power on the DC bus 136 into AC power, which is provided to the line side bus 188. In particular, switching devices (e.g. IGBTs, MOSFETs, etc.) used in bridge circuits of the line side power converter 168 can be modulated to convert the DC power on the DC bus 136 into AC power on the line side bus 188. The transformer can convert the AC power at a first voltage from the line side bus 188 to AC power at a second voltage, such as the voltage of power on the stator bus 154. The AC power from the power converter 162 can be combined with the power from the stator of DFIG 120 to provide multi-phase power (e.g. three-phase power) having a frequency maintained substantially at the frequency of the cluster network or the electrical grid 184 (e.g. 50 Hz/60 Hz).

The power converter 162 can receive control signals from, for instance, the control system 176 via the control device 174. The control signals can be based, among other things, on sensed conditions or operating characteristics of the DFIG system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 2A:
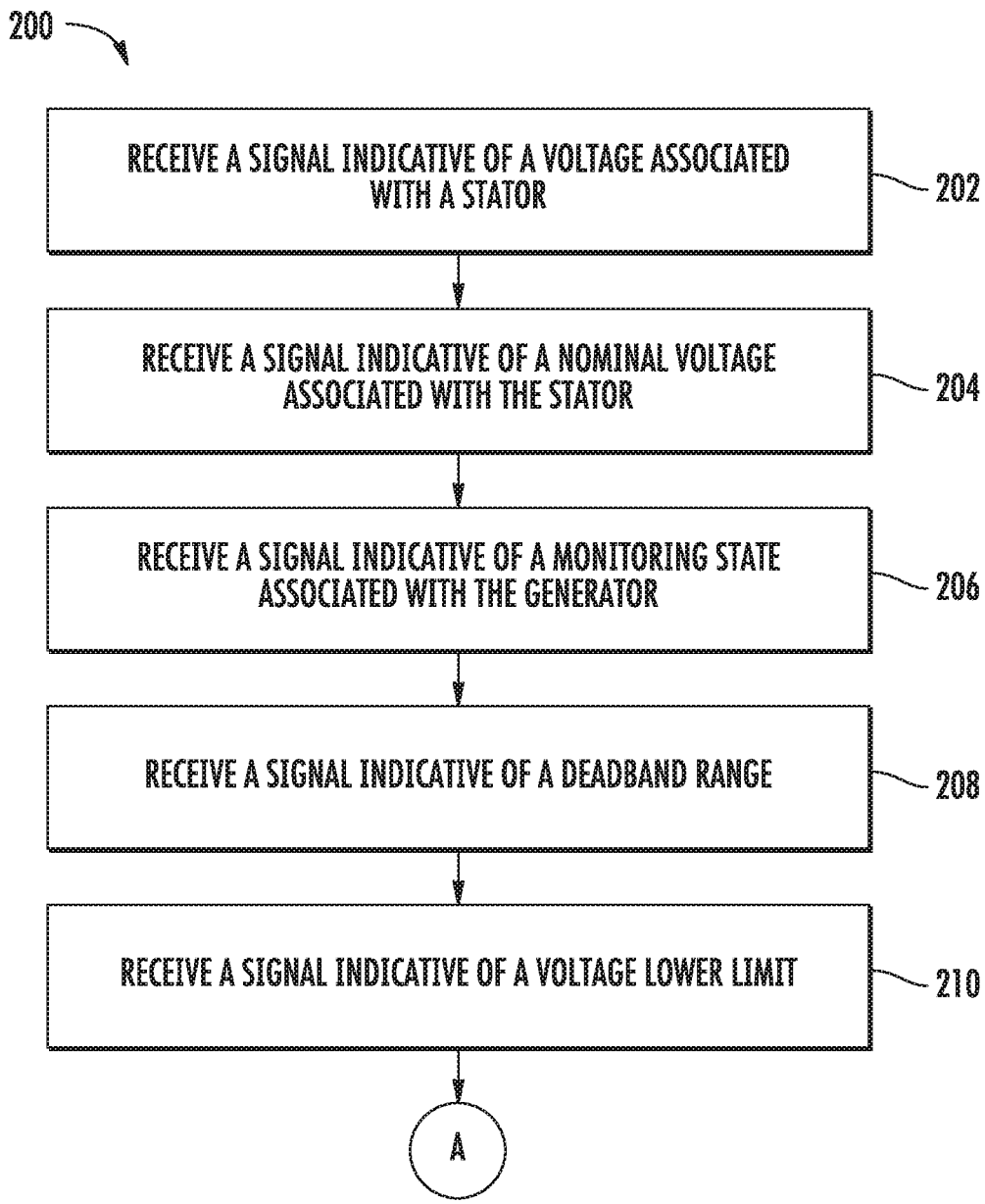
FIG. 2A and FIG. 2B depict an example flow diagram according to example aspects of the present disclosure.
Figure 2B:
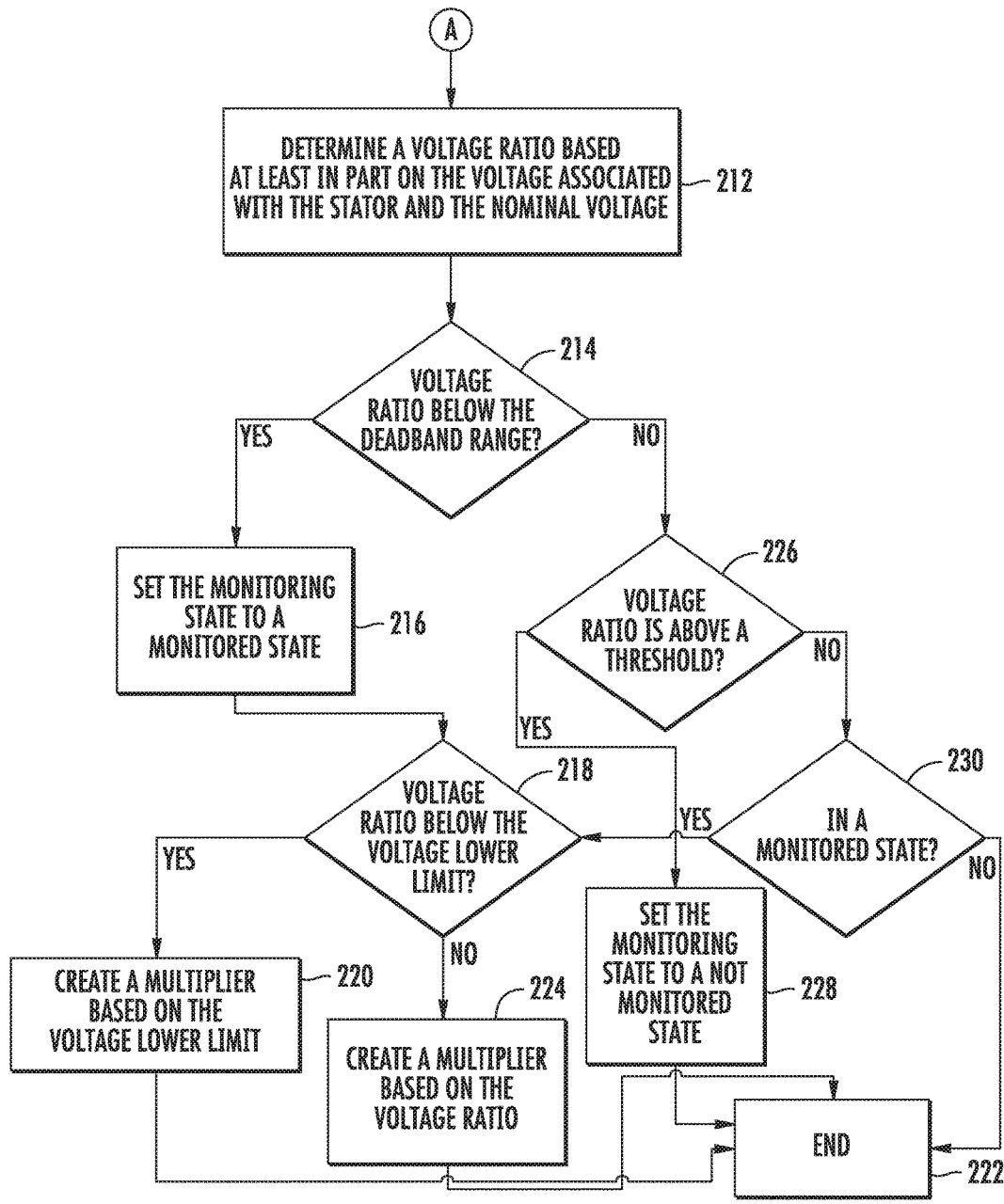

Referring now to FIGS. 2A and 2B, an example control method 200 for protecting a generator according to example aspects of the present disclosure is depicted. The generator can be a DFIG generator in a DFIG system. The generator can be a full-power conversion generator. The generator can include and/or be in communication with a control device, such as the control device 710 described in reference to FIG. 7. Method 200 can be executed using the control device 710.

At (202), a signal indicative of a voltage associated with a stator can be received. For example, the control device 710 can receive a signal indicative of a voltage associated with a stator. At (204), a signal indicative of a nominal voltage associated with the stator can be received. For example, the control device 710 can receive a signal indicative of a nominal voltage associated with the stator. At (206), a signal indicative of a monitoring state associated with the generator can be received. For example, the control device 710 can receive a signal indicative of a monitoring state associated with the generator. At (208), a signal indicative of a deadband range can be received. For example, the control device 710 can receive a signal indicative of a deadband range. At (210), a signal indicative of a voltage lower limit can be received. For example, the control device 710 can receive a signal indicative of a voltage lower limit.

At (212), a voltage ratio can be determined based at least in part on the voltage associated with the stator and the nominal voltage. For example, the control device 710 can determine a voltage ratio based at least in part on the voltage associated with the stator and the nominal voltage. At (214), a determination can be made of if the voltage ratio is below the deadband range. For example, the control device 710 can make a determination of if the voltage ratio is below the deadband range. If the voltage ratio is below the deadband range, the method 200 can move to (216). If the voltage ratio is not below the deadband range, the method 200 can move to (226). At (216), the monitoring state can be set to a monitored state. For example, the control device 710 can set the monitoring state to a monitored state. In a monitored state, a multiplier can be determined based on varying voltage conditions to adjust operating limits associated with the generator.

At (218), a determination can be made of if the voltage ratio is below the voltage lower limit. For example, the control device 710 can make a determination of if the voltage ratio is below the voltage lower limit. If the voltage ratio is below the voltage lower limit, the method 200 can move to (220). If the voltage ratio is at or above the voltage lower limit, the method 200 can move to (224). At (220), a multiplier can be created based on the voltage lower limit. For example, the control device 710 can create a multiplier based on the voltage lower limit. At (222), the method 200 can end. At (224), a multiplier can be created based on the voltage ratio. For example, the control device 710 can create a multiplier based on the voltage ratio. In an embodiment, the multiplier can be chosen from a lookup table. In another embodiment, the multiplier can be made from a calculation.

Whether the lookup table or the calculation is used, the resulting multiplier can be arrived at with consideration of an offset to the voltage ratio. The offset can include and/or be created based on a filtering of the voltage ratio, terms related to the generator construction and thermal time constants, and/or other factors that can produce a multiplier appropriate to the operating limits of the generator. In some embodiments, the multiplier can be equal to or greater than one.

At (226), a determination can be made of if the voltage ratio is above a threshold. For example, the control device 710 can make a determination of if the voltage ratio is above a threshold. The threshold can be, for example, 1 or any other appropriate value. If the voltage ratio is above the threshold, the method 200 can move to (228). If the voltage ratio is not above the threshold, the method 200 can move to (230). At (228), the monitoring state can be set to a not monitored state. For example, the control device 710 can set the monitoring state to a not monitored state. In a not monitored state, a multiplier may not be determined to adjust operating limits of the generator. At (230), a determination can be made of if the monitoring state is set to a monitored state. For example, the control device 710 can make a determination of if the monitoring state is set to a monitored state. If the monitoring state is set to a monitored state, then the method 200 can move to (218). If the monitoring state is not set to a monitored state, then the method 200 can move to (222).

Figure 3:
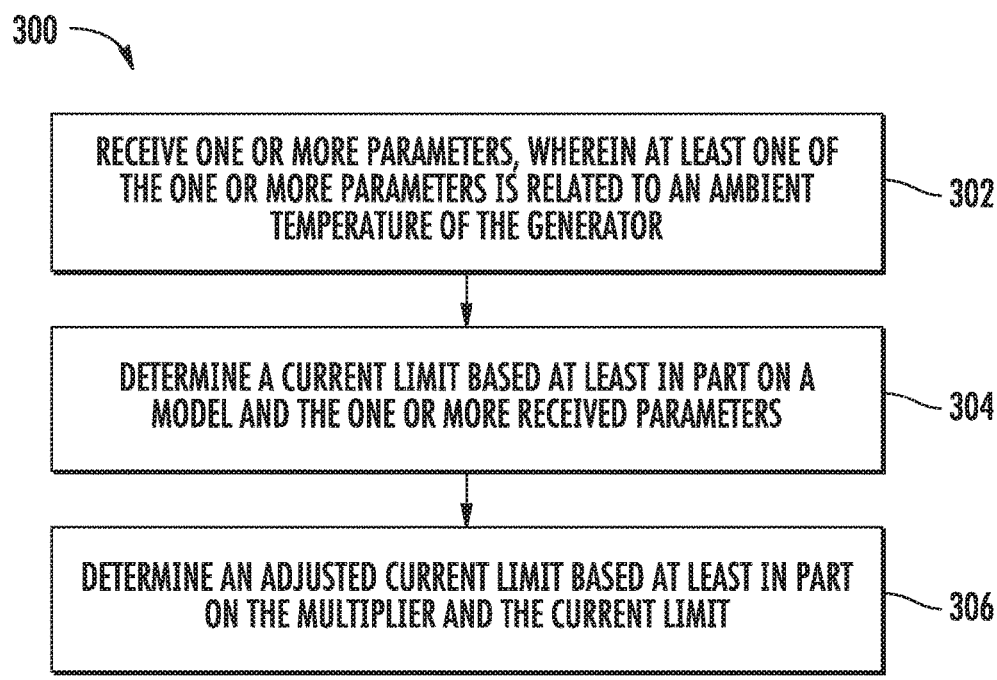
FIG. 3 depicts an example flow diagram according to example aspects of the present disclosure.

Referring now to FIG. 3, an example method 300 for determining a current limit according to example aspects of the present disclosure is depicted. The current limit can be a current limit for a generator. The generator can be a DFIG generator in a DFIG system. The generator can be a full-power conversion generator. The generator can include and/or be in communication with a control device, such as the control device 710 described in reference to FIG. 7. Method 300 can be executed using the control device 710.

At (302), one or more parameters can be received. For example, the control device 710 can receive one or more parameters. At least one of the one or more parameters can be related to an ambient temperature of the generator. At least one of the one or more parameters can be related to a speed of the generator. At least one of the one or more parameters can be associated with a rotor speed. At least one of the one or more parameters can be associated with a coolant temperature. At least one of the one or more parameters can be associated with a voltage on an electrical grid.

At (304), a current limit can be determined based at least in part on a model and the one or more received parameters. For example, the control device 710 can determine a current limit based at least in part on a model and the one or more received parameters. At (306), an adjusted current limit can be determined based at least in part on the multiplier and the current limit. For example, the control device 710 can determine an adjusted current limit based at least in part on the multiplier and the current limit.

Figure 4:
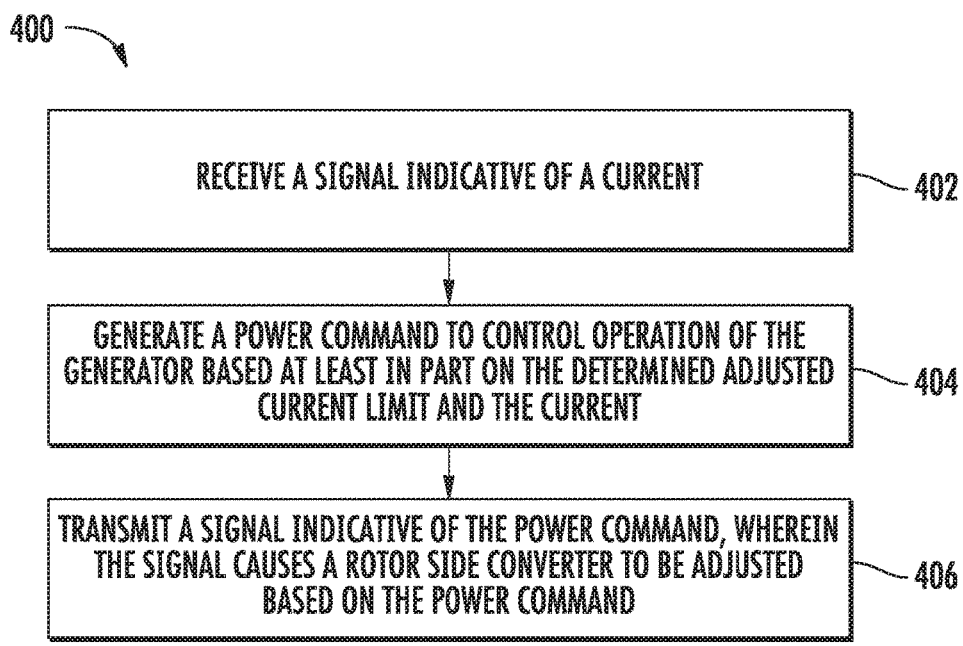
FIG. 4 depicts an example flow diagram according to example aspects of the present disclosure.

Referring now to FIG. 4, an example method 400 for causing a rotor side converter to be adjusted according to example aspects of the present disclosure is depicted. A generator can include the rotor side converter. The generator can be a DFIG generator in a DFIG system. The generator can be a full-power conversion generator. The generator can include and/or be in communication with a control device, such as the control device 710 described in reference to FIG. 7. Method 400 can be executed using the control device 710.

At (402), a signal indicative of a current can be received. For example, the control device 710 can receive a signal indicative of a current. At (404), a power command to control operation of the generator can be generated based at least in part on the determined adjusted current limit and the current. For example, the control device 710 can generate a power command to control operation of the generator based at least in part on the determined adjusted current limit and the current. The power command can include a value corresponding to a real power. The power command can include a value corresponding to a reactive power. At (406), a signal indicative of the power command can be transmitted. For example, the control device 710 can transmit a signal indicative of the power command. The signal can cause a rotor side converter to be adjusted based on the power command.

Figure 5:
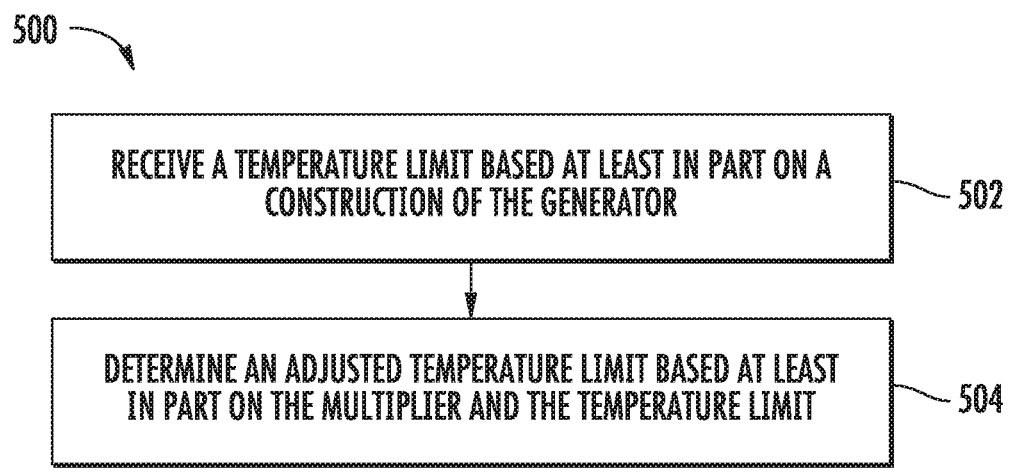
FIG. 5 depicts an example flow diagram according to example aspects of the present disclosure.

Referring now to FIG. 5, an example method 500 for determining a temperature limit according to example aspects of the present disclosure is depicted. The temperature limit can be a temperature limit for a generator. The generator can be a DFIG generator in a DFIG system. The generator can be a full-power conversion generator. The generator can include and/or be in communication with a control device, such as the control device 710 described in reference to FIG. 7. Method 500 can be executed using the control device 710.

At (502), a temperature limit can be received based at least in part on a construction of the generator. For example, the control device 710 can receive a temperature limit based at least in part on a construction of the generator. At (504), an adjusted temperature limit can be determined based at least in part on the multiplier and the temperature limit. For example, the control device 710 can determine an adjusted temperature limit based at least in part on the multiplier and the temperature limit.

Figure 6:
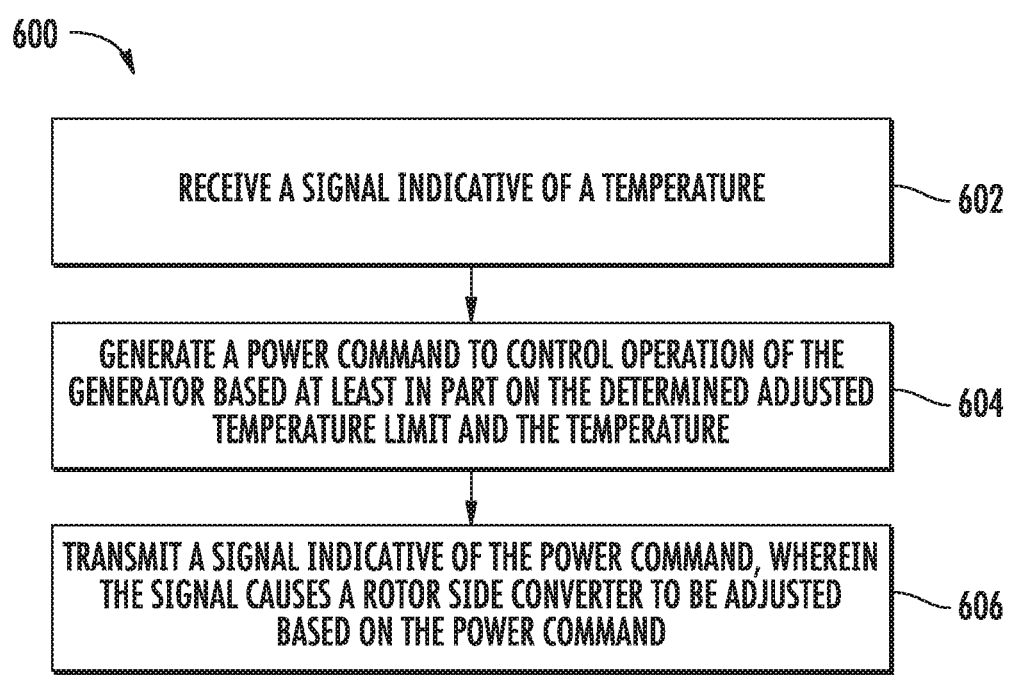
FIG. 6 depicts an example flow diagram according to example aspects of the present disclosure.

Referring now to FIG. 6, an example method 600 for causing a rotor side converter to be adjusted according to example aspects of the present disclosure is depicted. A generator can include the rotor side converter. The generator can be a DFIG generator in a DFIG system. The generator can be a full-power conversion generator. The generator can include and/or be in communication with a control device, such as the control device 710 described in reference to FIG. 7. Method 600 can be executed using the control device 710.

At (602), a signal indicative of a temperature can be received. For example, the control device 710 can receive a signal indicative of a temperature. At (604), a power command to control operation of the generator can be generated based at least in part on the determined adjusted temperature limit and the temperature. For example, the control device 710 can generate a power command to control operation of the generator based at least in part on the determined adjusted temperature limit and the temperature. The power command can include a value corresponding to a real power. The power command can include a value corresponding to a reactive power. At (606), a signal indicative of the power command can be transmitted. For example, the control device 710 can transmit a signal indicative of the power command. The signal can cause a rotor side converter to be adjusted based on the power command.

Figure 7:
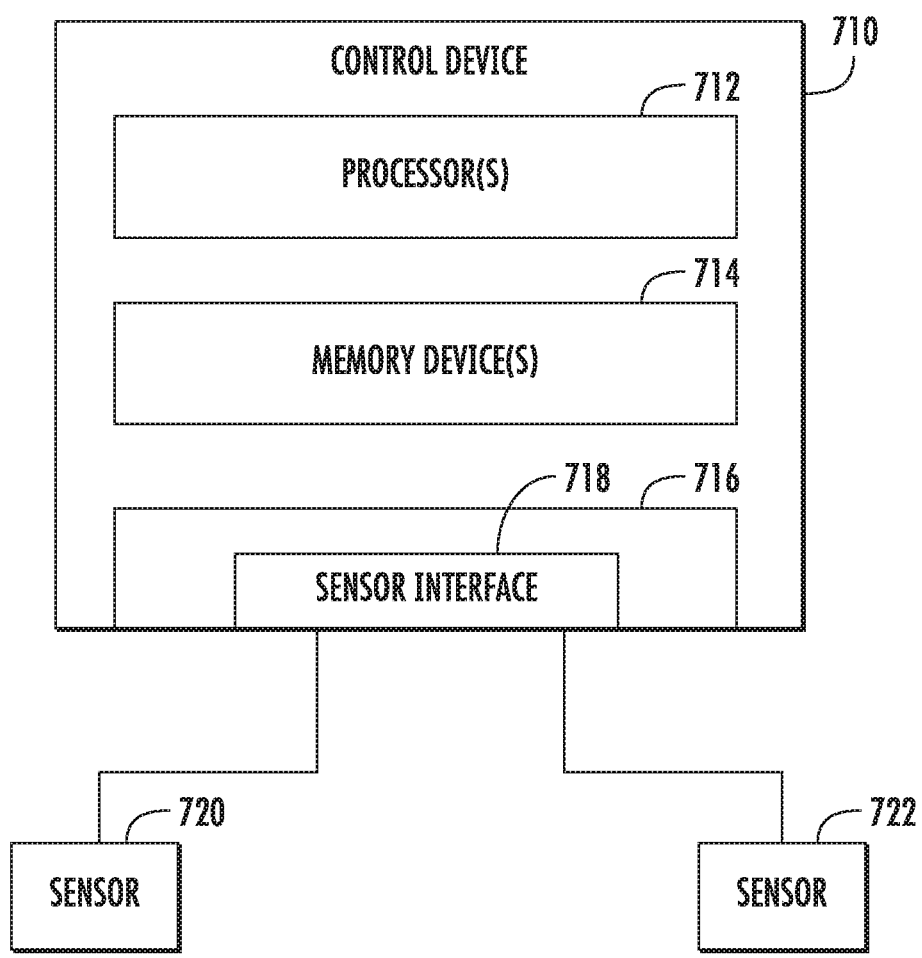
FIG. 7 depicts elements suitable for use in a control device according to example aspects of the present disclosure.

FIG. 7 depicts an example control device 710 according to example embodiments of the present disclosure. The control device 710 can be, for example, a control device 174 or a control system 176, and can be associated with an DFIG wind turbine system, a wind farm (e.g., a cluster-level or farm-level control device) and/or can include one or more control devices associated with aspects of a wind turbine system, such as one or more control devices associated with a power conversion system 162. In some embodiments, the one or more control devices 710 can include one or more processor(s) 712 and one or more memory device(s) 714. The processor(s) 712 and memory device(s) 714 can be distributed so that they are located at one more locales or with different devices.

The processor(s) 712 and memory device(s) 714 can be configured to perform a variety of computer-implemented functions and/or instructions (e.g., performing the methods, steps, calculations and the like and storing relevant data as disclosed herein). The instructions when executed by the processor(s) 712 can cause the processor(s) 712 to perform operations according to example aspects of the present disclosure. For instance, the instructions when executed by the processor(s) 712 can cause the processor(s) 712 to implement the methods of FIG. 3 (300) discussed herein.

Additionally, the control device 710 can include a communication interface 716 to facilitate communications between the control device 710 and various components of a wind turbine system, wind farm, or power system, including power demand parameters or power generation setpoints as described herein. Further, the communication interface 716 can include a sensor interface 718 (e.g., one or more analog-to-digital converters) to permit signals transmitted from one or more sensors 720, 722 to be converted into signals that can be understood and processed by the processor(s) 712. It should be appreciated that the sensors (e.g. sensors 720, 722) can be communicatively coupled to the sensor interface 718 using any suitable means, such as a wired or wireless connection. The signals can be communicated using any suitable communications protocol. The sensors (720, 722) can be, for example, voltage sensors, current sensors, power sensors, temperature sensors, or any other sensor device described herein.

As such, the processor(s) 712 can be configured to receive one or more signals from the sensors 720 and 722. For instance, in some embodiments, the processor(s) 712 can receive signals indicative of a voltage of a DC bus 136 from the sensor 720, such as from one or more voltage sensors. In some embodiments, the processor(s) 712 can receive signals indicative of a bridge circuit current from sensor 722.

Figure 8:
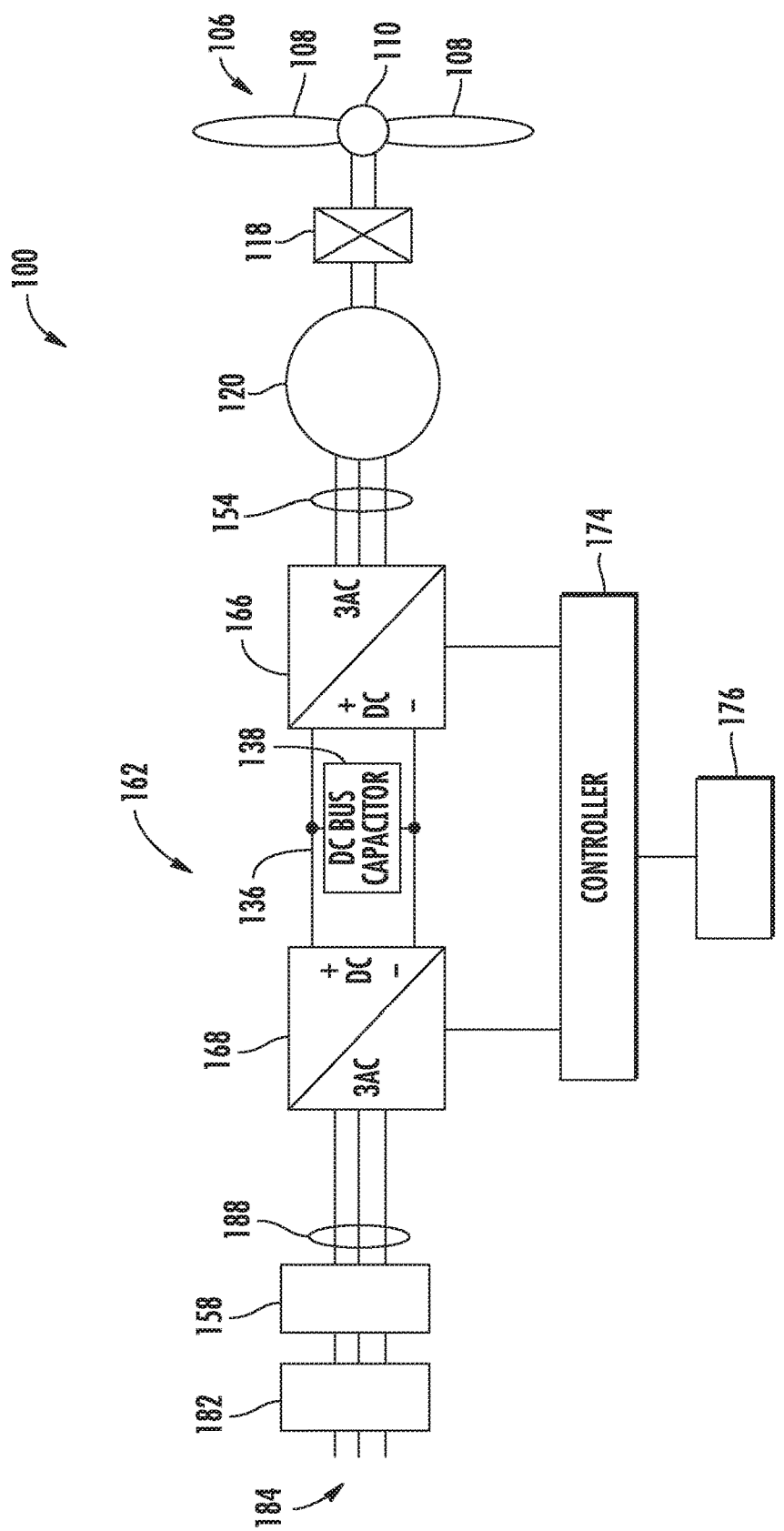
FIG. 8 depicts an example power system according to example aspects of the present disclosure.

Referring now to FIG. 8, an example power system 100 in a full-power conversion configuration is depicted. Elements that are the same or similar to those in FIG. 1 are referred to with the same reference numerals. As shown, in a full-power conversion configuration, all power generated by a generator 120 can be provided to a power converter 162. The power converter 162 can be connected to a line side bus 188. The line side bus 188 can be connected to the cluster network or the electrical grid 184.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 714 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 714 can generally be configured to store suitable computer-readable instructions that, when implemented by the processor(s) 712, configure the control device 710 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a generator comprising:
   receiving, by one or more control devices, a signal indicative of a voltage associated with a stator;
   receiving, by the one or more control devices, a signal indicative of a nominal voltage associated with the stator;
   receiving, by the one or more control devices, a signal indicative of a monitoring state associated with the generator, the monitoring state being associated with active monitoring of the generator;
   determining, by the one or more control devices, a voltage ratio based at least in part on the voltage associated with the stator and the nominal voltage;
   determining, by the one or more control devices, an adjusted operating limit using a multiplier determined based at least in part on the voltage ratio; and
   generating, by the one or more control devices, a power command to control operation of the generator based at least in part on the adjusted operating limit.

2. The method of claim 1, wherein the adjusted operating limit comprises an adjusted current limit or an adjusted temperature limit.

3. The method of claim 1, wherein the method comprises receiving, by the one or more control devices, a signal indicative of a deadband range;
   wherein when the voltage is outside of the deadband range, determining, by the one or more control devices, the adjusted operating limit comprises:
      setting, by the one or more control devices, the monitoring state to a monitored state;
   wherein when in the monitored state, the method comprises:
      determining, by the one or more control devices, the multiplier based on a voltage lower limit when the voltage ratio is below the voltage lower limit;
      creating, by the one or more control devices, the multiplier based on the voltage ratio when the set voltage ratio is at or above the voltage lower limit; and
      determining, by the one or more control devices, the adjusted operating limit based at least in part on the multiplier and an initial operating limit.

4. The method of claim 3, wherein when the voltage ratio is not below the deadband range, determining, by the one or more control devices, the adjusted operating limit comprises:
   setting, by the one or more control devices, the monitoring state to a not monitored state when the voltage is above a threshold.

5. The method of claim 4, wherein when the voltage ratio is within the deadband range and when the monitoring state is in the monitored state, determining, by the one or more control devices, the adjusted operating limit comprises:
   determining, by the one or more control devices, the multiplier based on the voltage lower limit when the set voltage ratio is below the voltage lower limit; and
   determining, by the one or more control devices, the multiplier based on the set voltage ratio when the set voltage ratio is at or above the voltage lower limit.

6. The method of claim 1, wherein the power command comprises a value corresponding to a real power or a reactive power.

7. The method of claim 1, wherein the multiplier has a value greater than or equal to one.

8. The method of claim 1, wherein the adjusted operating limit is an adjusted current limit, and wherein determining, by the one or more control devices, the adjusted operating limit based at least in part on the voltage ratio further comprises:
   receiving, by the one or more control devices, one or more parameters, wherein at least one of the one or more parameters is related to an ambient temperature of the generator;
   determining, by the one or more control devices, a current limit based at least in part on a model and the one or more received parameters; and
   determining, by the one or more control devices, the adjusted current limit based at least in part on the multiplier and the current limit.

9. The method of claim 8, wherein at least one of the one or more parameters is associated with a rotor speed.

10. The method of claim 8, wherein at least one of the one or more parameters is associated with a coolant temperature.

11. The method of claim 8, wherein at least one of the one or more parameters is associated with a voltage on an electrical grid.

12. A system for controlling a generator comprising:
   one or more control devices configured to:
   receive a signal indicative of a voltage associated with a stator;
   receive a signal indicative of a nominal voltage associated with the stator;
   receive a signal indicative of a monitoring state associated with the generator, the monitoring state being associated with active monitoring of the generator;
   receive a signal indicative of a deadband range;
   determine a voltage ratio based at least in part on the voltage associated with the stator and the nominal voltage;
   determine an adjusted operating limit using a multiplier based at least in part on the voltage ratio; and generate a power command to control operation of the generator based at least in part on the adjusted operating limit.

13. The system of claim 12, wherein the adjusted operating limit comprises an adjusted current limit or an adjusted temperature limit.

14. The system of claim 12, wherein when the voltage ratio is outside the deadband range, the one or more control devices are further configured to:
set the monitoring state to a monitored state;
determine the multiplier based on a voltage lower limit when the voltage ratio is below the voltage lower limit;
determine the multiplier based on the voltage ratio when the set voltage ratio is at or above the voltage lower limit; and
determine the adjusted operating limit based at least in part on the multiplier and an initial operating limit.

15. The system of claim 14, wherein when the voltage ratio is not below the deadband range, the one or more control devices are further configured to:
set the monitoring state to a not monitored state when the voltage ratio is above a threshold.

16. The system of claim 15, wherein when the voltage ratio is not outside the deadband range and when the monitoring state is in the monitored state, the one or more control devices are further configured to:
determine the multiplier based on the voltage lower limit when the set voltage ratio is below the voltage lower limit; and
determine the multiplier based on the set voltage ratio when the set voltage ratio is at or above the voltage lower limit.

17. The system of claim 12, wherein the power command comprises a value corresponding to a real power.

18. The system of claim 12, wherein the power command comprises a value corresponding to a reactive power.

19. The system of claim 12, wherein the adjusted operating limit is an adjusted current limit, and wherein the one or more control devices are further configured to:
receive one or more parameters, wherein at least one of the one or more parameters is related to an ambient temperature of the generator;
determine a current limit based at least in part on a model and the one or more received parameters; and
determine the adjusted current limit based at least in part on the multiplier and the current limit.

20. A wind farm comprising:
one or more control devices configured to:
receive a signal indicative of a voltage associated with a stator;
receive a signal indicative of a nominal voltage associated with the stator;
receive a signal indicative of a monitoring state associated with the generator, the monitoring state being associated with active monitoring of the generator;
receive a signal indicative of a deadband range;
determine a voltage ratio based at least in part on the voltage associated with the stator and the nominal voltage;
determine an adjusted operating limit using a multiplier determined based at least in part on the voltage ratio; and
generate a power command to control operation of the generator based at least in part on the adjusted operating limit.

* * * * *